United States Patent Office 3,845,023
Patented Oct. 29, 1974

3,845,023
HEAT-CURABLE COPOLYMERS BASED ON HYDROXYALKYLESTERS AND N-ALKOXYMETHACRYLAMIDES, SHOWING EXCELLENT ADHESIVE PROPERTIES ESPECIALLY ON METALLIC SUBSTRATES
Horst Dalibor, Hamburg-Harksheide, Germany, assignor to Reichhold-Albert-Chemie Aktiengesellschaft, Hamburg, Germany
No Drawing. Continuation-in-part of abandoned application Ser. No. 124,586, Mar. 15, 1971. This application Dec. 22, 1972, Ser. No. 317,568
Claims priority, application Switzerland, Mar. 19, 1970, 4,149/70, 4,150/70
Int. Cl. C08f 15/40
U.S. Cl. 260—80.73    1 Claim

ABSTRACT OF THE DISCLOSURE

Manufacture of heat-curable copolymers, yielding coatings of improved pigment binding capacity, adhesion, impact strength and other desirable properties, by copolymerization of styrene, hydroxyethyl methacrylate, acrylic acid, etherified N-methylol-methacrylic amide and esterification products of methacrylic acid and polypropylene glycol, said copolymers being used for making multi-coat as well as single-coat stoving lacquers, especially on sheet metal. These copolymers are new and can be employed by themselves or together with other binders for the production of stoving lacquers.

Cross-Reference to Related Applications

This is a continuation-in-part application of application Ser. No. 124,586 filed in the U.S. Patent Office on Mar. 15, 1971, now abandoned. Applicant's claim priority of Swiss patent applications Ser. Nos. 4,150/70 and 4,149/70 filed in the Patent Office of Switzerland on Mar. 19, 1970.

BACKGROUND OF THE INVENTION

1. Field of the invention

This invention relates to new copolymers which can be employed by themselves as binders for the production of stoving lacquers or which might also be used in combination with other binding agents for the production of stoving lacquers.

2. Prior art

German Displayed Specification 1,102,410 discloses stoving lacquers which contain
 I. organic solvents, and
 II. copolymers of
  (A) esters of acrylic acid or methacrylic acid with alkanols,
  (B) ethers of N-methylolacrylamide or N-methylolmethacrylamide with alkanols or phenylalkanols,
  (C) monoesters of acrylic acid or methacrylic acid with polyhydride hydroxy compounds, and also optionally additionally,
  (D) other compounds possessing an ethylenically unsaturated, copolymerizable group, such as acrylonitrile, acrylic and methacrylic acid, higher esters of ethylenecarboxylic acids, styrene and vinyl acetate. Such stoving lacquers give coatings which, after stoving, are distinguished by a series of valuable properties as, for instance, good resistance against solvents and against yellowing. The coatings, however, have little resistance against boiling washing lye and also little corrosion resistance. The adhesion of the stoving lacquer on steel sheets or on bonder sheets, especially when pigmented more fully, leaves something to be improved also. The pigment binding capacity of the lacquer, which becomes an important fact for the use as one-coat lacquer, does not suffice. Comparison Test 1 gives a comparable working method, wherein only one hydroxy compound is employed, and which does not lead to such valuable coatings as are prepared according to the method of the present invention.

The British Pat. 1,127,232 to Bashford et al. claim a process for the production of a binder suitable for use in stoving compositions composing copolymerizing styrene, acrylic acid esters, N-alkoxymethyl acrylamides, and acrylic acid to produce a binder which is water-soluble after neutralization. A hydroxy ester of acrylic acid is used additionally by Bashford to support the water solubility of the composition.

In the present process a combination of two hydroxy components is employed by which a high reactivity of the coating composition as well as an excellent elasticity of the finished lacquerings is achieved as can be derived from Example 1 of the present invention. The result obtained by the sole use of hydroxyethylmethacrylate, however, is shown by Comparison Test 1.

U.S. Pat. 3,453,345 to Mabrey et al. claims a heat hardenable linear addition copolymer comprising the interpolymerization reaction product of acrylamide, a lower aliphatic aldehyde, an alcohol, a hydroxyl ester of acrylic or methacrylic acid, an unsaturated carboxylic acid and at least one monomer. Mabrey employs only one hydroxyl component for his copolymer and therefore does not achieve such outstanding properties of the copolymers of the present invention, as is demonstrated by Comparison Test 2. He also does not employ the ether of the N-methylolmethacrylamide as a substance but suggests its formation in the reaction mix from the starting components.

In the present invention, however, it has been discovered that improved stovable coating compositions are obtained when the polymerization mixture of the indicated monomers contains the component (d), the ether of the N-methylolmethacrylamide with the $C_1$ to $C_8$-alkanol present, per se in the mixture, in combination with the other ingredients before the copolymerizing starts. That is, it has been discovered that, surprisingly superior physical properties in the coatings are obtained if the component (d) is prepared ahead of time, prior to reaction with the other monomers. By Comparison Test 3 of the present invention, the instructions given by Example 4, composition 21, of Mabrey have carefully been followed and coatings prepared from the obtained copolymer have been tested. These testing results show the improved properties obtained by the method of the present invention.

Summary of the Invention

The subject of the invention is a process for the manufacture of heat-curable copolymers which are soluble in organic solvents, by copolymerizing a mixture consisting of:

(a) 30 to 45 percent by weight of styrene,
(b) 5 to 10 percent by weight of hydroxyethyl methacrylate,
(c) 1 to 2 percent by weight of acrylic acid,
(d) 18 to 22 percent by weight of an ether of N-methylolmethacrylamide etherified with n-butanol or isobutanol or their mixture,
(e) 25 to 35 percent by weight of butyl acrylate or 2-ethylhexyl acrylate or their mixture, and
(f) 5 to 10 percent by weight of a hydroxyalkyl ester of methacrylic acid with hydroxyl numbers of about 130 to 150 and having the following formula:

$$H_2C=\underset{CH_3}{\underset{|}{C}}-C\underset{\diagdown O-CH_2-\underset{CH_3}{\underset{|}{CH}}}{\overset{\diagup O}{}}\left[O-CH_2-\underset{CH_3}{\underset{|}{CH}}\right]_n O-CH_2-\underset{OH}{\underset{|}{CH}}$$

wherein $n$ represents integers between 2 and 6, the sum of the percentages of the compounds designated (a) to (f) always being 100, and wherein the copolymerizing is carried out in the temperature range of 60 to 125° C. in the presence of organic solvents, polymerization catalysts and chain regulators.

A further preferred embodiment of the process is characterized in that as monomeric ethers of N-methylolmethacrylamide with n-butanol or isobutanol, the mixture of the reaction products of methacrylamide, paraformaldehyde, butanol and/or isobutanol, wherein the molar ratios were 1 to 1.5 mols of para-formaldehyde and 1 to 3 mols of n-butanol or isobutanol relative to 1 mol of methacrylamide, and an acid or an acid-donating catalyst was present during the manufacturing process, is employed for the copolymerization.

A special further embodiment of the process is characterized in that an ether of N-methylolmethacrylamide with n-butanol or isobutanol is employed which contains the catalyst or its esterification products in its solution, maleic anhydride having been employed as the catalyst.

As component (d), ethers of N-methylolacrylamide or N-methylolmethacrylamide with saturated alkanols which contain 1 to 8 carbon atoms, such as methanol, ethanol, propanol, n-butanol, isobutanol, pentanol, hexanol, heptanol, octanol or 2-ethylhexanol, are employed. Ethers of N-methylolacrylamide or N-methylolmethacrylamide with isobutanol or n-butanol are preferred.

The particularly preferred ethers of N-methylolmethacrylamide with n-butanol or isobutanol are obtained by a particularly appropriate reaction of the reagents in the ratio of 1 mol of methacrylamide and 1 to 1.5 mols of paraformaldehyde with 1 to 3 mols of n-butanol or isobutanol and maleic anhydride by warming, and with water being distilled off to a large extent. A reaction product using ratios of the reagents of 1 mol of methacrylamide, 1.2 mols of paraformaldehyde and 2 mols of n-butanol or isobutanol and 0.01 to 0.03 mols of maleic anhydride is most suitable. The reaction mixture employed, consisting of methacrylamide, paraformaldehyde, n-butanol and maleic anhydride, after reaction yields approx. 65% by weight ±3% by weight of the ether of N-methylolmethacrylamide with n-butanol and approx. 35% by weight ±3% by weight of n-butanol, whilst in the reaction of methacrylamide, paraformaldehyde, isobutanol and maleic anhydride a product of approx. 64% by weight ±3% by weight of the ether of N-methylolmethacrylamide with isobutanol and approx. 36% by weight ±3% by weight of isobutanol is obtained.

The most preferred embodiment of the process consists of employing, as the ether of N-methylolmethacrylamide with n-butanol, the reaction mixture solution obtained from the reaction of 4 mols of methacrylamide, 4.67 mols of paraformaldehyde, 8 mols of n-butanol and 0.03 mols of maleic anhydride, with water being separated off. Such a reaction mix contains, approximately:

64.0% by weight of the ether of N-methylolmethacrylamide with n-butanol,
32.5% by weight of butanol,
0.8% by weight of paraformaldehyde,
1.6% by weight of water,
0.6% by weight of methacrylamide and
0.5% by weight of maleic acid monobutyl ester.

A further reaction mix which also belongs to the most preferred embodiment of the process consists of employing, as the ether of N-mehtylolmethacrylamide with isobutanol, the reaction mixture solution obtained from the reaction of 4 mols of methacrylamide, 4.67 mols of paraformaldehyde, 8.0 mols of isobutanol and 0.03 mols of maleic anhydride, with water being separated off. Such a reaction mix approx. contains:

63.4% by weight of the ether of N-methylolmethacrylamide with isobutanol,
33.0% by weight of isobutanol,
0.8% by weight of paraformaldehyde,
1.5% by weight of water,
0.8% by weight of methacrylamide and
0.5% by weight of maleic acid monoisobutyl ester.

If the ether of N-methylolmethacrylamide with isobutanol is employed together with the monomeric compounds mentioned under (a) to (f), products are obtained which after stoving yield hard surface lacquerings. If, however, a product is desired which is to show more elastic properties after the stoving process, a copolymer is prepared with the ether of N-methylolmethacrylamide with n-butanol, and the monomeric compounds mentioned under (a) to (f).

As component (e), esters of acrylic acid or methacrylic acid with a saturated monoalkanol possessing 1 to 10 carbon atoms are employed, such as methyl methacrylate, ethyl methacrylate, butyl methacrylate, 2-ethylhexyl methacrylate, methyl acrylate, ethyl acrylate, n-butyl acrylate, isobutyl acrylate, sec.-isobutyl acrylate or 2-ethylhexyl acrylate. N-butyl acrylate, isobutyl acrylate or 2-ethylhexyl acrylate are preferably employed.

As component (f), hydroxyalkyl esters of methacrylic acid or of acrylic acid, which represent esterification products of methacrylic acid or acrylic acid and polypropylene glycol, are employed.

The polypropylene glycol radicals contained in the component (f) have a molecular weight of about 200 to about 500. These hydroxyalkyl esters of methacrylic acid or acrylic acid have hydroxyl numbers of about 100 to about 200. The particularly preferred hydroxyalkyl esters of acrylic acid or methacrylic acid have hydroxyl numbers of about 130 to about 150.

Suitable solvents for the copolymers according to the invention are the customary solvents, say alkylbenzenes, such as toluene and xylene, alcohols, such as n- and iso-butanols, monoethers of diols, such as ethanediol monomethyl ether, esters of alkanols, such as acetic acid ethyl ester, and monoether-monoesters of diols, such as ethanediol monomethyl ether-monoacetic acid ester, as well as mixtures of such substances with one another or with petrol hydrocarbons.

The manufacture of the copolymers can be carried out in the usual manner, in general appropriately by solution polymerization in those solvents which are also intended to be constituents of the finished stoving lacquers. The polymerization can appropriately be initiated by the customary initiators, or initiator systems of initiators and activators.

Suitable polymerization initiators for the process according to the invention are all compounds which form free radicals under the reaction conditions. Peroxy compounds and azonitriles are preferred. Examples of suitable peroxy compounds are dibenzoyl peroxide, dilauroyl peroxide, dimethyl peroxide, diethyl peroxide, di-tert.-butyl peroxide, dioctadecyl peroxide, t-butyl peroxypivalate, disuccinoyl peroxide, urea peroxide, peracetic acid and perbenzoic acid, alkyl dialkyl boronperoxides and alkali persulphates, perborates and percarbonates, in each case by themselves or in combination with a reducing agent. Suitable azonitriles are for example 1,1-azodicyclohexanecarbonitrile, $\alpha,\alpha'$-azobis-($\alpha$ - cyclopropylpropionitrile), $\alpha,\alpha'$-azobis-(isobutyronitrile), $\alpha,\alpha'$-azobis-($\alpha,\gamma$-dimethylvaleronitrile), $\alpha,\alpha'$-azobis-($\alpha$-phenylpropionitrile), $\alpha,\alpha'$-azobis-($\alpha$-cyclohexylpropionitrile), $\alpha,\alpha'$-azobis - ($\alpha$-methyl-$\gamma$-carboxybutyronitile), disodium $\gamma,\gamma'$-azobis-($\gamma$-cyanovalerate) and 1,1'-azodicamphanecarbonitrile.

The degree of polymerization and hence the viscosity of the copolymers is adjusted to the desired value by the conjoint use of the customary regulators, such as mercaptans and aldehydes. As chain-regulating mercaptans, butyl mercaptan, octyl mercaptan, lauryl mercaptan and tert.-dodecyl mercaptan are preferably employed.

A preferred process for the manufacture of the new copolymers consists of allowing the monomer mixture, including the polymerization catalysts and chain regulators, separately or as a mixture, to run into the solvent mixture, consisting of xylene/n-butanol or xylene/isobutanol, the ratio of xylene to n-butanol or isobutanol being from 1 to 10 up to 2 to 1 parts by weight, heated to the reflux temperature, at a uniform rate over a period of about one to ten hours, during which the polymerization temperatures should be between 60° C. and about 125° C. The polymerization is then continued for about a further 6 to 14 hours in order to achieve as complete conversion of the monomers as possible. In order reliably to exclude gel formation during polymerization, the polymerization temperature should not exceed 130° C., even for a short time, in the case of the above mentioned solvent mixtures, but should if possible remain within the indicated temperature range of 60 to 125° C.

In the preferred embodiment of the process, the polymerization initiators or polymerization catalysts are employed in amounts of 0.8 to 1.5% by weight relative to the weight of the monomer mixture, di-tertiary butyl peroxide being most appropriately employed. In the preferred embodiment of the process, the chain regulators are used in amounts of 0.5 to 1.5% by weight, relative to the weight of the monomer mixture, with tertiary dodecyl mercaptan being most appropriately employed.

The improvements in the copolymers, and in the stoving lacquers which can be manufactured with them, achieved through a quantitative and also a special qualitative selection of the monomeric components (a) to (f) were surprising and not foreseeable.

As copolymers which are used as a 50% strength by weight solution in a mixture of xylene/n-butanol or xylene/isobutanol, those having a viscosity of I to Z according to Gardner-Holdt at 20° C. are particularly suitable.

The copolymers according to the invention are especially distinguished in that they have an improved pigment binding capacity and that the lacquerings manufactured from them develop their valuable properties practically completely already at relatively low stoving temperatures. Furthermore, lacquerings of improved adhesion and impact strength, and of particularly pronounced elasticity, weathering resistance, hardness and resistance to saponification are obtained from lacquers manufactured with such copolymers. If desired, it is additionally possible to obtain lacquerings which also possess other properties, such as light resistance, flexural strength, solvent resistance and temperature resistance, to a special degree.

From the copolymers manufactured according to the invention, stoving lacquers can be manufactured which, if desired, contain the additives which are customary in stoving lacquers, such as pigments, soluble dyestuffs, optical brighteners, and agents for promoting levelling and gloss. In particular, the stoving lacquers can contain, additionally to the copolymers, other lacquer binders which are customary, such as alkyd resins, aminoplastic resins, phenoplastic resins, epoxide resins, cellulose derivatives and polymers which are not identical with the copolymers of this invention, in a dissolved and/or dispersed form. The weight ratio of the copolymers to the additional, different lacquer binders should in general here be appropriately greater than 1, and especially greater than 2. The addition of the customary, different lacquer binders to the copolymers must be so chosen as to type and amount, that clear solutions are obtained, and that after the stoving process clear films are obtained. It has furthermore generally proved appropriate that the weight ratio of the solvents to the total proportion of binder in the stoving lacquers should be approximately from 0.4 to 3, in particular approximately from 0.6 to 1.5.

To manufacture lacquerings, the stoving lacquers based on the new copolymers can be applied to the articles to be lacquered by using the customary methods, for example by spraying, brushing, pouring, roller application, flooding, dipping or impregnation. The stoving of the lacquerings can, in general, appropriately be carried out at temperatures of about 120 to 180° C., especially of about 130 to 150° C. and, depending on the temperature, for a period of about 5 to 120 minutes, especially of about 20 to 40 minutes. Since the valuable properties of the lacquerings in particular come into play on metals, such as iron, aluminum, magnesium and alloys of these metals, the stoving lacquers are above all suitable for lacquering articles made of sheet metal, for example parts of car bodies, ships, washing machines and refrigerators, and also for the lacquering of cans, jugs, tubs, and industrial and household instruments. The stoving lacquers can equally be used to produce primer coats and top coats; because of their adhesion, they are furthermore very suitable for producing single-coat lacquering on metals, where the high surface gloss generally makes subsequent polishing superfluous.

If the lacquerings are to be stoved at temperatures which are as low as possible, and/or stoving lacquers are to be used which contain relatively little copolymerized acrylic acid or methacrylic acid in the copolymer, it may be appropriate to stove the stoving lacquers in the presence of curing agents. Acids, or acid donating substances, such as p-toluene sulfonic acid, phosphoric acid, maleic acid or tartaric acid which are costomary for curing polymers, are suitable for this purpose. In general, the amount of the curing agents should here appropriately be about 0.01 to 5, especially about 0.1 to 2, percent by weight of the copolymers.

The stoving lacquers are preferably used with the characterized copolymer as the sole binder, for one-coat lacquers. If, however, stoving lacquers or multi-coat stoving lacquers of particularly high solvent resistance and excellent surface hardness and gloss retention on weathering are demanded, the characterized copolymers are used in combination with aminoplastics.

Preferred aminoplastics are condensation products of formaldehyde and melamine, wherein about 4 to 6 mols of formaldehyde have been reacted per mol of melamine, either under weakly acid or under weakly basic conditions, and the products should be etherified almost completely, say to the extent of 80 to 100%, with n-butanol, isobutanol or methanol. The reaction products resulting therefrom should have a molecular weight of about 300 to 1200 and should be soluble in organic solvents such as xylene and n-butanol, isobutanol, methanol or glycol ethers, and other alcohols. Formulations for suitable melamine resins are to be found as examples in Swiss Patent Specification 480,380 and in German Displayed Specification 1,127,083.

The copolymer and the aminoplastic resin, in the ratio of 65 to 95 parts by weight of the copolymer and 5 to 35 parts by weight of the aminoplastic resin, are dissolved in the organic solvent. The quantity ratios of the copolymer and of the alkylated aminoplastic should be so chosen that the two components are compatible both in the coating solution and in the finished film. Any suitable concentration of the copolymer and of the aminoplastic in the solvent, for example 1 to 50% by weight, can be employed, given this proviso. If a pigment is present, the total content of solids in the coating composition is between 5 and 75% by weight. The ratio of pigment to binder (copolymer plus aminoplastic) can lie between 1:20 and 1:2.

In order that those skilled in the art can more fully understand the present invention, the following examples are set forth. The example is given solely for the purpose of illustrating the invention, and should not be considered as expressing limitations unless so set forth in the appended claims. All parts and percentages are by weight, unless otherwise stated.

EXAMPLE 1

Manufacture of the copolymer solution 1

The following mixture is added to a mixture consisting of 317 g. of xylene and 163 g. of n-butanol at the boil, in a flask equipped with a stirrer, reflux condenser and thermometer, the mixture being run in uniformly over the course of four hours: 225 g. of styrene, 11 g. of acrylic acid, 30 g. of hydroxyethyl methacrylate, 175 g. of 2-ethylhexyl acrylate, 9 g. of tert.-dodecyl mercaptan, 8 g. of di-tert.-butyl peroxide, 43 g. of a 70% strength by weight solution, in xylene, of the hydroxylalkyl ester of methacrylic acid which represents an esterification product of methacrylic acid and polypropylene glycol, having a hydroxyl number of about 130, and 184 g. of a 65% strength by weight solution, in butanol, of the ether of N-methylolmethacrylamide and n-butanol, present as a component of a reaction mix produced from four mols of methacrylamide, 4.67 mols of paraformaldehyde, 8 mols of n-butanol and 0.03 mols of maleic anhydride, under warming and distilling the water off. Thereafter, the whole is polymerized at the boil for a further 8 to 10 hours, until the solution has a solids content of 50% by weight and the viscosity is W to Y, measured according to Gardner-Holdt at 20° C.

Use of the copolymer 1

54 g. of this copolymer solution 1, 32 g. of titanium dioxide pigment (rutile) and 9 g. of xylene and 2.5 g. of ethylglycolacetate are homogenized for 24 hours in a ball mill. After subsequent dilution to spraying viscosity with a mixture of xylene and ethylglycol, the sprayable stoving lacquer is applied to a zinc-phosphatized steel sheet as well as to untreated steel sheets, air-dried, and stoved in 30 minutes between 150 and 180° C.

HARDNESS

| | | | |
|---|---|---|---|
| Stoving temperature, ° C | 150 | 180 | 180 |
| Stoving time, minutes | 30 | 15 | 30 |
| Pendulum hardness according to König | 143 | 148 | 147 |
| Hardness according to Buchholz | 125 | 133 | 133 |
| Scratch resistance | 1-2 | 1-2 | 1 |

NOTE.—1=Lacquer surface cannot be damaged by scratching with a finger nail; 2=Lacquer surface can be damaged by scratching with a finger nail.

ELASTICITY

| | | | |
|---|---|---|---|
| Stoving temperature, ° C | 150 | 180 | 180 |
| Stoving time, minutes | 30 | 15 | 30 |
| Erichsen deepening, deep-drawing sheet, mm | 7.7 | 7.2 | 6.8 |
| Erichsen deepening, bonder-sheet 97, mm | 4.5 | 4.9 | 4.0 |
| Mandrel test ASTM D 522, Erichsen-sheet | 0 | 0 | 0 |
| Mandrel test ASTM D 522, Bonder-sheet 97 | 0 | 0 | 0 |

NOTE.—0=Unobjectionable; 1=0.1 to 0.5 cm. torn.

| | | | |
|---|---|---|---|
| Stoving temperature, ° C | 150 | 180 | 180 |
| Stoving time, minutes | 30 | 15 | 30 |
| Gloss according to Lange measured at an angle of 45°, percent | 103 | 108 | 99 |

RESISTIVITIES

| | | | |
|---|---|---|---|
| Stoving temperature (40 to 45 μ) ° C | 140 | 150 | 180 |
| Stoving time (layer thickness of dry film) min | 30 | 30 | 15 |
| Washing liquor (load duration 3 cycles) | 0 | 0 | 0 |
| Washing liquor (load duration 4 cycles) | $g_1m_0-m_1$ | 0 | 0 |
| Xylene (6 minutes) | 1 | 0 | 0 |

NOTE.—
1 cycle=2.5% by weight of washing liquor, boiling for 8 hours, 16 hours in washing liquor at room temperature.
g=Size of blisters; $g_0$=No blisters; $g_1$=Blisters just visible by eye; $g_2$=Blisters being a little larger; m=The amount of blisters; $m_0$=No blisters; $m_1$=20% of the surface covered with blisters; $m_2$=40% of the surface covered with blisters.
Xylene: 0=Not damaged; 1=Surface can be scratched on, but no swelling; 2=Surface can be scratched on, slight swelling; 3=Lacquer film can be scratched on, slight swelling.

SALT SPRAY TEST ASTM B 117-64

| | | | |
|---|---|---|---|
| Stoving temperature, ° C | 150 | 180 | 180 |
| Stoving time, minutes | 30 | 15 | 30 |
| Bonder-sheet 97 (load duration 240 hours) mm | 0-1.0 | 0-1.0 | 0-1.0 |
| Bonder-sheet 97 (load duration 500 hours) mm | 1.0-2.0 | 0-1.0 | 0-1.0 |

NOTE.—Decomposition at the cross-cut is given in mm.

KESTERNICH-TEST

| | Blisters | Blisters | Blisters |
|---|---|---|---|
| Bonder-sheet 97 (5 cycles) | 0 | 0 | 0 |

The sheets were hung up in a chamber of a capacity of 300 litres at a temperature of 40±3° C. and a relative air humidity of 100%.

Additionally 2 liters of sulphur dioxide are passed into the closed chamber (cabinet according to Kesternich).
1 cycle=8 hours load duration, as described above, and 16 hours at room temperature.

| Thermal aging at 140° C | 0 h. | 100 h. | 200 h. | 300 h. | 400 h. | 500 h. |
|---|---|---|---|---|---|---|
| Gloss according to Lange 45° | 102 | 105 | 104 | 105 | 104 | 104 |
| Yellowing | −11 | −11,5 | +1 | +15 | +21 | +26 |

The yellowing is being measured using a Leukometer compared to magnesium oxide as "normal white."
The value 0 equals magnesium oxide minus values mean whiter than magnesium oxide plus values mean more yellow than magnesium oxide.

Compatibility with alkyd resins

COMPATIBILITY WITH ALKYD RESINS

| Mixing ratio copolymer/alkyd | In 1[1] solution | In the stoved film | In 2[2] solution | In the stoved film |
|---|---|---|---|---|
| 90:10 | Compatible | Compatible | Compatible | Compatible |
| 75:25 | do | do | do | oD |
| 50:50 | do | do | do | Do |
| 25:75 | do | do | do | Do |
| 10:90 | do | do | do | Do |

NOTE.—
1[1]=Alkyd resin consisting of 33% by weight of dehydrated castor oil, trimethylol propane and phthalic anhydride.
2[2]=Alkyd resin consisting of 40% by weight of dehydrated castor oil, glycerol and phthalic anhydride.

The copolymer 1 may also be used in combination with epoxy resins for a one-coat lacquering. A mixture in the following amounts has proven useful as coating composition.

Parts by weight 52.00 copolymer 1,
2.00 epoxy resin on the basis of bisphenol A and epichlorohydrin having an epoxide equivalent weight of 450 to 525, an epoxide value of 0.19 to 0.22 and a softening paint according to Durrans of 65 to 75° C.,
32.00 titanium dioxide (Rutil),
6.10 xylene,
2.00 solvesso 150 (solvent),
3.00 ethylglycolacetate,
1.00 silicon oil L o50
 1% by weight solution in xylene and
1.90 bentone 34-paste
10% by weight in xylene.

The viscosity of the composition according to Gardner-Holdt amounts to "J" at 20° C., and the binder/pigment ratio is about 1:1.2.
Spray viscosity may be achieved by using the following solvent mixture:

35.00 xylene,
20.00 butanol,
30.00 solvesso 150 and
15.00 ethylglycolacetate.

Stoving Conditions:
30 min. at 140° C.—150° C.
15 min. at 170° C.—180° C.

Comparison Tests to prove the advance over the art

Test 1

The procedure followed is exactly as indicated in Example 1, with the exception that in manufacturing the copolymer, the hydroxyalkyl ester of methacrylic acid and polypropylene glycol is replaced by the same amount of hydroxyethyl methacrylate. The data are determined on bondered steel sheet (bonder 97) with a pigmented lacquer and are shown in the table as compared with Example 1 of the present invention.

| Stoving conditions 150° C., 30 minutes | Example 1 according to the invention | Test 1 |
|---|---|---|
| Erichsen deep-drawing value | 4.5 mm | 2.3 mm |
| Mandrel test ASTM D 522 over 6 mm. mandrel | Perfect | Lacquering flakes off |
| Washing liquor, 4 cycles | 0 | Destroy g² m² |
| 240 h., salt spray test ASTM 117-64 | 0-1.0 mm | 4-8 mm |

Test 2

Corresponding to the method of the present invention a copolymer was prepared from 86 g. of a 70% strength by weight xylene solution of the esterification product of methacrylic acid and polypropylene glycol, having a hydroxyl number of about 130 and the other components of Example 1 of the present invention. The 30 g. of hydroxyethylmethacrylate employed in Example 1, however, has been omitted from this reaction mixture in order to study the change of properties of the stoving lacquer prepared therewith. Coating were prepared as described in Example 1 of the present invention.

Test 3

The copolymer of Mabrey et al., U.S. Pat. 3,453,345, has been made following the instruction given in Example 4, Composition 21. Coatings were prepared from this copolymer in the same manner as described in Example 1 of the present invention and subjected to mechanical tests and also to hot washing liquor.

The following tables give the testing results in comparison to Example 1 of the present invention.

| Stoving conditions 150° C., 30 minutes | Erichsen deep-drawing values, mm. |
|---|---|
| Test 2 | 4.9 |
| Test 3 | 1.5 |
| Example 1 | 4.5 |

The Erichsen deep-drawing value of the lacquer containing no hydroxyethylmethacrylate (Test 2) is slightly higher than the value obtained by Example 1 (Test 1) of the present invention, but this small advantage is easily overcome by the sum of the less positive data of the other tests carried out.

The copolymer of Mabrey (Test 3) shows the *worst* Erichsen deep-drawing value.

Tests for hardness and gloss gave the following results:

| Pendulum hardness in seconds according to König | Test 2 | Test 3 | Example 1 |
|---|---|---|---|
| Stoving temperature, 150° C.; stoving time, 30 min | 115 | 145 | 143 |
| Stoving temperature, 180° C.; stoving time, 15 min | 118 | 145 | 148 |
| Stoving temperature, 180° C.; stoving time, 30 min | 115 | 140 | 147 |

| Hardness according to Buchholz | Test 2 | Test 3 | Example 1 |
|---|---|---|---|
| Stoving temperature, 150° C.; stoving time, 30 min | 90 | 100 | 125 |
| Stoving temperature, 180° C.; stoving time, 15 min | 95 | 105 | 133 |
| Stoving temperature, 180° C.; stoving time, 30 min | 95 | 105 | 133 |

| Scratch resistance | Test 2 | Test 3 | Example 1 |
|---|---|---|---|
| Stoving temperature, 150° C.; stoving time, 30 min | 2-3 | 3 | 1-2 |
| Stoving temperature, 180° C.; stoving time, 15 min | 2 | 3 | 1-2 |
| Stoving temperature, 180° C.; stoving time, 30 min | 2 | 3 | 1 | wherein 1 means the best value.

| Gloss according to Lange at 45° | Percent | | |
|---|---|---|---|
| | Test 2 | Test 3 | Example 1 |
| Stoving temperature, 150° C.; stoving time, 30 min | 95 | 100 | 103 |
| Stoving temperature, 180° C.; stoving time, 15 min | 100 | 100 | 108 |
| Stoving temperature, 180° C.; stoving time, 30 min | 90 | 95 | 99 |

Resistivities are measured using a dry film thickness of 40 to 45μ.

| Washing liquor, load duration 3 cycles | Test 2 | Test 3 | Example 1 |
|---|---|---|---|
| Stoving temperature, 140° C.; stoving time, 30 min | $m_2$ | Destroyed | 0 |
| Stoving temperature, 150° C.; stoving time, 30 min | $g_2m_1$ | do | 0 |
| Stoving temperature, 180° C.; stoving time, 15 min | $g_2m_1$ | do | 0 |

| Washing liquor, load duration 4 cycles | Test 2 | Test 3 | Example 1 |
|---|---|---|---|
| Stoving temperature, 140° C.; stoving time, 30 min | Destroyed | | $g_1m_0$ to $m_1$ |
| Stoving temperature, 150° C.; stoving time, 30 min | Flakes off | | 0 |
| Stoving temperature, 180° C.; stoving time, 15 min | do | | 0 |

| Xylene, 6 minutes | Test 2 | Test 3 | Example 1 |
|---|---|---|---|
| Stoving temperature, 140° C.; stoving time, 30 min | 3 | Dissolved | 1 |
| Stoving temperature, 150° C.; stoving time, 30 min | 2 | 3 | 0 |
| Stoving temperature, 180° C.; stoving time, 15 min | 2 | 3 | 0 |

The Salt Spray Test has been carried out on bondered metal sheets (Bonder 97) according to ASTM B 117-64.

| Load duration, 240 hours | Millimeter | | |
|---|---|---|---|
| | Test 2 | Test 3 | Example 1 |
| Stoving temperature, 150° C.; stoving time, 30 min | 2-5 | 10-15 | 0-1.0 |
| Stoving temperature, 180° C.; stoving time, 15 min | 3-6 | 10-15 | 0-1.0 |
| Stoving temperature, 180° C.; stoving time, 30 min | 2-5 | 10-15 | 0-1.0 |

| Load duration, 500 hours | Millimeter | | |
|---|---|---|---|
| | Test 2 | Test 3 | Example 1 |
| Stoving temperature, 150° C.; stoving time, 30 min | 10-15 | Destroyed | 1.0-2 |
| Stoving temperature, 180° C.; stoving time, 15 min | 12-16 | do | 0-1.0 |
| Stoving temperature, 180° C.; stoving time, 30 min | 12-15 | do | 0-1.0 |

NOTE.—The decomposition is given in min. from the crosscut.

Kesternich-Test on bondered metal sheets (Bonder 97)

| | Test 2 | Test 3 | Example 1 |
|---|---|---|---|
| After 5 cycles | Blisters | Blisters | No blister formation |

THERMAL AGING AT 140° C.

| Time | 0 h. | 100 h. | 200 h. | 300 h. | 400 h. | 500 h. |
|---|---|---|---|---|---|---|
| Yellowing: | | | | | | |
| Test 2 | −15 | +1 | +20 | +55 | +80 | +120 |
| Test 3 | −20 | +10 | +50 | +150 | +250 | Yellow |
| Ex. 1 | −11 | −11.5 | +1 | +15 | +21 | +26 |

These testing results prove the superior properties, which had not been foreseeable, of lacquerings obtained using the copolymer of the present invention (Example 1).

The new copolymer of this invention show outstanding properties, concerning their lacquer-technical behaviour with all binders known up to now, which properties can usually only be obtained by using a combination of binders and even then only on the sections of the surface protection of sheets.

The mechanical behaviour as well as the surface hardness, elasticity and resistance against washing liquors and solvents and the scarcely appearing yellowing shows that here binders are present having unexpected optimal properties.

It will be obvious to those skilled in the art that other changes and variations can be made in carrying out the present invention without departing from the spirit and scope thereof as defined in the appended claim.

1. A heat-curable copolymer which is soluble in organic solvents consisting of:
(a) 30 to 45% by weight of styrene,
(b) 5 to 10% by weight of hydroxyethyl methacrylate,
(c) 1 to 2% by weight of acrylic acid,
(d) 18 to 22% by weight of an ether of N-methylolmethacrylamide etherified with n-butanol or isobutanol or their mixture,
(e) 25 to 35% by weight of butyl acrylate, or 2-ethylhexyl acrylate or their mixture and
(f) 5 to 10% by weight of a hydroxyalkyl ester of methacrylic acid with hydroxyl numbers of about 130 to about 150 of the following formula:

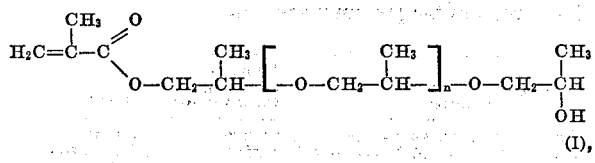

wherein $n$ represents integers between 2 and 6.

References Cited

UNITED STATES PATENT 3,453,345   7/1969   Mabrey et al. _____ 260—834

FOREIGN PATENT 1,127,232   9/1968   England _____ 260—80.73

STANFORD M. LEVIN, Primary Examiner

U.S. Cl. X.R.

260—31.2 N, 31.4 R, 33.2 R, 33.4 R, 33.6 UA, 41 B, 836, 851, 873; 117—132 B